US009725213B2

(12) United States Patent
Weyrauch (10) Patent No.: US 9,725,213 B2
(45) Date of Patent: Aug. 8, 2017

(54) METALLIC BUNG CLOSURE WITH PROTECTIVE PLASTIC LAYER

(71) Applicant: Mauser-Werke GmbH, Brühl (DE)

(72) Inventor: Detlev Weyrauch, Kreuzau-Untermaubach (DE)

(73) Assignee: MAUSER-WERKE GMBH, Brühl (DE)

(*) Notice: Subject to any disclaimer, the term of this patent is extended or adjusted under 35 U.S.C. 154(b) by 5 days.

(21) Appl. No.: 14/396,668

(22) PCT Filed: Apr. 23, 2013

(86) PCT No.: PCT/EP2013/001220
§ 371 (c)(1),
(2) Date: Oct. 23, 2014

(87) PCT Pub. No.: WO2013/159913
PCT Pub. Date: Oct. 31, 2013

(65) Prior Publication Data
US 2015/0096988 A1  Apr. 9, 2015

(30) Foreign Application Priority Data
Apr. 23, 2012 (DE) .................... 20 2012 004 201 U (51) Int. Cl.
*B65D 39/16* (2006.01)
*B65D 39/08* (2006.01)
(Continued)

(52) U.S. Cl.
CPC ...... *B65D 39/086* (2013.01); *B29C 45/14336* (2013.01); *B65D 39/08* (2013.01);
(Continued)

(58) Field of Classification Search
CPC ...... B65D 39/086; B65D 39/08; B65D 39/16; B65D 39/088; B65D 2539/008;
(Continued)

(56) References Cited

U.S. PATENT DOCUMENTS

| 3,856,172 A | * | 12/1974 | Walles | ........... A47J 41/022 |
|---|---|---|---|---|
| | | | | 215/12.2 |
| 3,923,192 A | * | 12/1975 | Walters | ........... B65D 53/00 |
| | | | | 220/235 |
| 4,195,750 A | | 4/1980 | Fee | |
| 4,863,030 A | * | 9/1989 | Bayer | ........... B65D 41/0457 |
| | | | | 206/427 |

(Continued)

FOREIGN PATENT DOCUMENTS

| CN | 201882374 | 6/2011 |
|---|---|---|
| DE | 35 05 426 | 3/1986 |

(Continued)

OTHER PUBLICATIONS

International Search Report issued by the European Patent Office in International Application PCT/EP2013/001220 on Aug. 22, 2013.

Primary Examiner — James N Smalley
(74) Attorney, Agent, or Firm — Henry M. Feiereisen LLC (57) ABSTRACT

A bung closure for gas-tight and liquid-tight closure of a bung opening of a container, includes a cup-shaped basic body made from metal and having a disk-shaped base and an adjoining, upwardly open, tubular ring part; at least one interlocking element in the form of a shaped sheet-metal strip or a tab provided within the cup-shaped basic body for engagement with a screwing tool for screwing the bung closure into, and out of the bung opening of the container; and a stable plastics layer provided on the outer side of the ring part, with an external thread formed on an outside of the plastics layer for threaded engagement with the internal thread of the bung opening.

16 Claims, 4 Drawing Sheets (51) Int. Cl.
*B29C 45/14* (2006.01)
*B29K 23/00* (2006.01)
*B29K 705/00* (2006.01)
*B29L 1/00* (2006.01)
*B29L 31/56* (2006.01)

(52) U.S. Cl.
CPC .......... *B65D 39/088* (2013.01); *B65D 39/16* (2013.01); *B29K 2023/12* (2013.01); *B29K 2705/00* (2013.01); *B29L 2001/00* (2013.01); *B29L 2031/565* (2013.01); *B65D 2539/008* (2013.01)

(58) Field of Classification Search
CPC .......... B29C 45/14336; B29K 2705/00; B29K 2023/12; B29L 2031/565; B29L 2001/00
USPC ................ 220/288, 601, 284; 215/355, 364; 138/90
See application file for complete search history.

(56) References Cited

U.S. PATENT DOCUMENTS

| | | | |
|---|---|---|---|
| 5,709,313 A | 1/1998 | Richoux et al. | |
| 5,971,189 A * | 10/1999 | Baughman | B65D 39/084 220/288 |
| 7,287,662 B2 | 10/2007 | van de Klippe et al. | |
| 2003/0218015 A1* | 11/2003 | Randolph | A47G 19/2272 220/212.5 |
| 2006/0102583 A1* | 5/2006 | Baughman | B65D 39/088 215/216 |

FOREIGN PATENT DOCUMENTS

| | | |
|---|---|---|
| DE | 198 37 343 | 3/2000 |
| EP | 0 806 369 | 11/1997 |
| JP | H 04-239448 | 8/1992 |
| WO | WO 2009/064032 | 5/2009 |

\* cited by examiner

METALLIC BUNG CLOSURE WITH PROTECTIVE PLASTIC LAYER

CROSS-REFERENCE TO RELATED APPLICATIONS

This application is the U.S. National Stage of International Application No. PCT/EP2013/001220, filed Apr. 23, 2013, which designated the United States and has been published as International Publication No. WO 2013/159913 A1 and which claims priority of German Patent Application Serial No. 20 2012 004 201.7, filed Apr. 23, 2012, pursuant to 35 U.S.C. 119(a)-(d).

BACKGROUND OF THE INVENTION

The invention relates to a bung closure for the gas-tight and liquid-tight closure of a bung opening of a container, in particular a steel drum for storing and for transporting in particular hazardous liquid charges.

Previously customary bung closures for tight-head steel drums are manufactured completely from metal and are generally known per se. A bung closure of this type is known, for example, from the document U.S. Pat. No. 7,287,662. The problem with said known bung closure is that, in certain applications, said bung closure has to be provided with a special, chemical-resistant phenol coating on the lower side coming into contact with the aggressive charge, including the external thread, to provide permanent protection against corrosion. However, this special paint coating can easily be abraded upon repeated unscrewing and screwing down of the bung closures, wherein, firstly, the paint abrasion then drops into the charge and contaminates the latter and, secondly, the abrasion points in the thread are coated too thinly or even no longer at all, and therefore corrosion forms there and the closure stoppers sometimes become badly jammed or very rusted in.

In addition, the screw threads of the bung closures have to have a highly accurate fit and low tolerances in order to be screwable in an absolutely tightly closed manner into the bung connectors with comparatively small tightening torques. There are only a few manufacturers of high-quality steel bung closures who divide up the corresponding market requirement at a high price level.

Bung closures, such as, in particular, tight-head steel drums, which are used, for example, in the chemical industry for storing and for transporting hazardous liquid charges (chemicals), customarily have to have passed an official design check. In said check, a container is subjected to different tests, such as, for example, an internal pressure test, a stacking test and a drop test, said tests also taking place at low temperatures. Said cold tests are carried out at −20° C., wherein the container is filled with a supercooled liquid which contains a high proportion of antifreezing agents. During said checking tests, the bung closures are inter alia also exposed with regard to the tightness thereof to high loadings.

SUMMARY OF THE INVENTION

It is therefore the object of the present invention to overcome the disadvantages of the prior art and to indicate a novel bung closure for bung containers, which bung closure is cost-effective to produce and is provided with rustproofing characteristics of the highest quality (without an additional coating of rustproofing paint), in particular for use for aggressive liquid charges. The novel bung closure here is at the same time also intended to have increased safety aspects and a protective function in the event of a fire (fire and heat impairment).

This object is achieved according to the invention by a bung closure for gas-tight and liquid-tight closure of a bung opening of a container, including a cup-shaped basic body made from metal and having a disk-shaped base and an adjoining, upwardly open, tubular ring part; at least one interlocking element in the form of a shaped sheet-metal strip or a tab provided within the cup-shaped basic body for engagement with a screwing tool for screwing the bung closure into, and out of the bung opening of the container; and a stable plastics layer provided on the outer side of the ring part, with an external thread formed on an outside of the plastics layer for threaded engagement with the internal thread of the bung opening, wherein the outer side of the ring part on which the plastics layer is provided is free of any thread formations. The dependent claims contain advantageous embodiments of the bung closure according to the invention. The improved properties with regard to rustproofing and the safety aspects, such as the protective function in the event of a fire (as rupture protection), are explained and described below.

Owing to the fact that the bung closure has a cup-shaped basic body made from metal, with a disk-shaped base and an adjoining, upwardly open, tubular ring part, wherein a plastics layer into which a corresponding external thread is formed—for screwing the bung closure into the bung opening in the bung connector of the steel drum—is applied to the outer side of the ring part, the same stability and strength as in the case of a conventional steel bung closure is ensured. In contrast to the conventional bung closures made from steel, into which, in a complicated additional working step, an external thread has to be rolled or cut, with removal of material, the present bung closure according to the invention has a stable plastics layer, in which the external thread is formed, on the outer side of the tubular ring part. As a result, the bung closure according to the invention is also lighter than conventional steel bung plugs.

In order to produce the "Composite bung closures" according to the invention, the cup-shaped basic body, as a metal blank, is simply inserted into an injection mold, after which a plastics layer, in which, by corresponding predetermination of the shape on the inside of the injection mold, a corresponding external thread is formed is sprayed—at least onto the outer side of the ring part. The plastics material used can be HD-PE (high density polyethylene), nylon or preferably PP (polypropylene). The layer thickness of the sprayed-on plastics layer is approximately 2 mm to 5 mm including the thread, wherein the external thread can be designed as a fine-pitch thread or, in the case of a thicker plastics layer, as a coarse-pitch thread, in a standardized US version or EP version, depending on customer requirements.

In the case of the conventional steel bung closures, the threads of the bung closure and bung connector have to be manufactured in a highly precise manner and within exacting tolerance ranges, with resultant high reject rates during production. The bung closure according to the invention, in which the external thread is incorporated into the sprayed-on plastics layer, is excused small inaccuracies in the design of the thread of the bung closure, which inaccuracies can be compensated for by the elastic flexibility of the plastics thread. The tolerance ranges can therefore be somewhat larger and the fitting accuracy somewhat lower.

The bung closure according to the invention has a very important advantage over the previously used, conventional steel bung closures. In the event of a fire, if the drums are exposed to a direct flame action and, due to the production of heat with a rise in the temperature and pressure in the liquid charge, there is the great risk of the steel drums bursting—so to say exploding—due to excess pressure, and hazardous, environmentally harmful chemicals may escape, the bung closure according to the invention serves as a safety element or pressure control valve, since the plastics material of the sprayed-on plastics layer with the thread formed therein softens at increased temperatures and is finally squeezed out of the bung connectors because of the excess pressure arising in the interior of the drum, wherein the thread is then so to say "lubricated" in the axial direction, as a result of which the bung closure is squeezed out of the bung opening upward and the hazardous excess pressure can escape from the container without explosion-like destruction of the container—and the hazardous liquid charge remains in the container. In this case, because of the highly temperature-conductive cup-shaped metal basic body, more rapid heating and softening of the thin plastics threaded layer is obtained than by comparison with a solid plastics plug.

In a refinement of the invention, a two-part design of the bung closure according to the invention is provided, in which the upper part not coming into contact with the charge is composed of metal, preferably steel, and the lower part coming into contact with the charge is composed of plastic. Accordingly, the novel "composite bung closure" is structurally distinguished by a novel material structure, in which the advantages of a known solid plastics plug are combined with those of a solid steel plug.

Owing to the fact that a continuous, leakproof plastics layer in which the external thread is formed on the outer side of the ring part is applied to the entire outer surface—the downwardly pointing surface in the normal position—of the cup-shaped basic body (=metal blank) with the disk-shaped base and the tubular ring part, the advantageous construction of a novel composite bung closure is provided, said construction having the effect that a charge which is possibly aggressive to metal (acid) can no longer come into contact with the cup-shaped basic body composed of metal. The plastics layer, which covers the lower side of the cup-shaped basic body, which lower side faces the drum interior, can be designed to be comparatively thin in order to satisfy the function of a rustproof covering. The cup-shaped basic body, which is made from metal or steel, of the composite bung closure according to the invention can be designed to be thinner overall, wherein, nevertheless, the great advantage is retained that the filling factory and also the final customer does not have to undertake any change to the handling and automatic filling and removal system at the existing filling and removal plants. The previous steel bung closures in the automatic industrial-chemistry filling plants are customarily unscrewed from the containers—generally tight-head steel drums—which are supplied empty, by magnetic gripping tools of an automatic screwdriver directly prior to the filling operation, are held by the gripping tool and, directly after the filling operation, are screwed again in a gas-tight and liquid-tight manner into the bung openings of the steel drums by the magnetic screwdrivers. Said magnetic screwdrivers are also frequently used at larger final customers in order to remove the charge.

The optimum tightening torques of the magnetic screwdrivers can be freely preselected and adjusted depending on the shape and material of the respective seal (for example round seal, rectangular seal). An appropriate, chemical-resistant material (EVOH, Viton and the like) is selected for the seal depending on the aggressivity of the charge to be transported.

In an advantageous refinement, a sealing lip, which is also injection-molded on, can be integrated into the outer plastics layer above the external thread just below the upper flange edge of the metallic basic body. Said sealing lip, which is also injection-molded on, can also be composed of a different plastics material than the basic plastics layer and molded on by two-component injection molding. It is then thereby possible to save on attaching a separate seal.

For a fixed connection of plastic on metal, at least the tubular ring part is provided with a roughened surface (for example ribbing, etching) on the outer side, on the contact surface with the outer plastics layer, as a result of which the sprayed-on plastics layer enters into an interlocking-type connection with the metal surface. This makes it possible also to transmit high torques without there being the risk that the thin plastics layer could become detached from the metallic basic body.

Furthermore, it is provided, in a simple refinement of the invention, that, in the cup-shaped basic body of the bung closure according to the invention—in precisely the same manner as in a conventional steel bung closure—an interlocking element in the form of a shaped sheet-metal strip with interlocking arcs on the outer side is welded onto the outer side (surface) of the disk-shaped base within the cup-shaped basic body in a manner known per se. The interlocking element serves for the fitting of the screwing tools.

In another refinement of the invention, a respective integrated interlocking element in the form of an upwardly curved sheet-metal strip is formed from the disk-shaped base on two diametrically opposite sides within the cup-shaped basic body as a stop element for the customary screw wrench for bung closures. As a result, the known, welded-in interlocking element in the form of the specially shaped sheet-metal strip with interlocking arcs on the outer side can be completely dispensed with. The complicated production and the process to weld in the separate component are entirely omitted. The manufacturing process of the integrated, interlocking stop elements according to the invention takes place directly during the shaping (punching, pressing, pushing, deep-drawing) of the metallic cup-shaped basic body by a punching operation for the two sheet-metal strips which are bent upward in a tongue-shaped or tab-shaped manner. For the fixing support of said sheet-metal strips and for closing the resultant cutout in the disk-shaped base and possibly edge of the cup-shaped basic body, the two integrated interlocking elements or upwardly bent sheet-metal-strip tabs are insert molded in a completely leakproof manner with plastic in the direction of the tubular ring part, wherein said insert molding is then an integrated part of the continuous, leakproof plastics layer below the disk-shaped base.

In a preferred refinement of the invention, it is provided that a respective integrated interlocking element in the form of a sheet-metal tab curved upward and inward is formed from the tubular ring part and partially from the disk-shaped base on at least two diametrically opposite sides within the cup-shaped basic body, said sheet-metal tab being fixedly connected at its upper end to the tubular ring part or to the upper flange edge and being fixedly connected at its lower end to the disk-shaped base. The cutouts in the tubular ring part and in the disk-shaped base of the metallic basic body, which cutouts are produced by the sheet-metal tabs being pushed out, are filled in an interlocking and completely leakproof manner with plastics material projecting therein from the outer, tubular or lower, disk-shaped plastics layer. In terms of manufacturing, the production of the two-part bung closure according to the invention is distinguished in that a cup-shaped basic body (=blank) made from metal, with a disk-shaped base and an adjoining, upwardly open, tubular ring part, is preformed with integrated interlocking elements in the form of curved metal tabs which are pushed out, and then a cup-shaped plastics part which is matched thereto and likewise has a disk-shaped base and an adjoining, upwardly open, tubular ring part with an external thread is premanufactured in an injection mold, after which the cup-shaped plastics part is pulled over the cup-shaped metal basic body and is nonreleasably fixedly latched and connected to corresponding undercuts in the tubular ring part via a snap-on/latching connection.

This advantageous refinement can be produced not only in a simple and more cost-effective manner in terms of manufacturing (fewer components), but also high torques can be transmitted without there being the risk of the six welding points of the known interlocking element, which is welded in separately, being detached. The omission of the welded-in sheet-metal strip means that the surface of the disk-shaped base of the metallic cup-shaped basic body is very smooth and, as a result, for example, even simple screwing tools with a pneumatic suction holder (vacuum) could advantageously be used. Of course, the cup-shaped metal basic body can also be insert molded as an insert in a corresponding injection mold in order to form the outer cup-shaped plastics part.

BRIEF DESRCIPTION OF THE DRAWING

The invention is explained and described in more detail below with reference to exemplary embodiments which are illustrated in the drawings, in which.

DETAILED DESCRIPTION OF PREFERRED EMBODIMENTS

Figure 1:
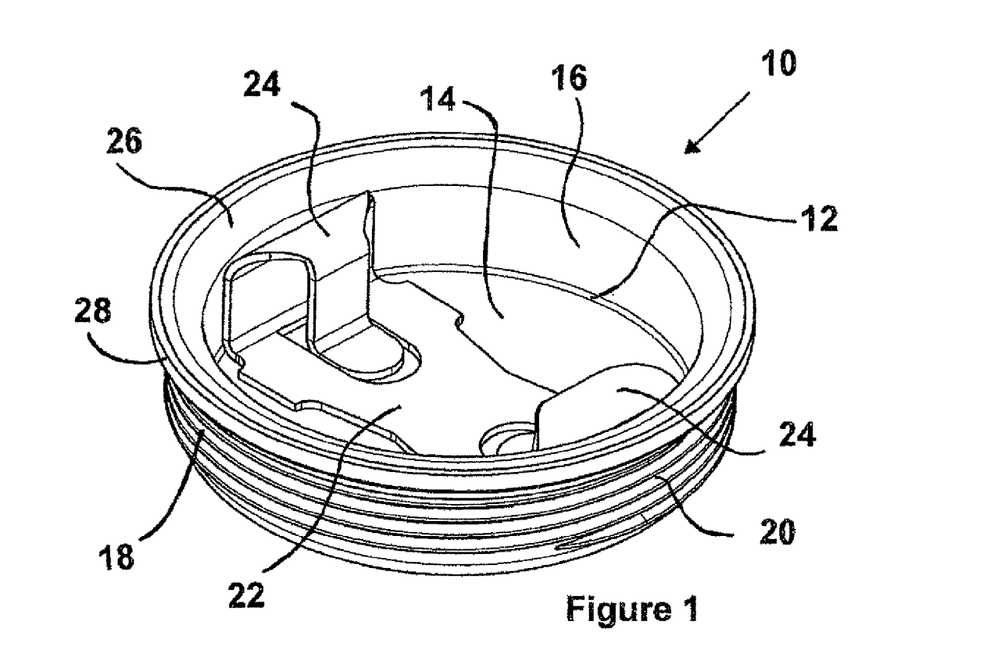
FIG. 1 shows a bung closure according to the invention in a perspective view.

In FIG. 1, the reference number 10 denotes a bung closure according to the invention which has a cup-shaped basic body 12 made from metal, with a disk-shaped base 14 and an adjoining, upwardly open, tubular ring part 16 with an upper flange edge 26, wherein a tubular plastics layer 18 in which a corresponding external thread 20 is formed—for screwing the bung closure 10 into the bung opening in the bung connector of a steel drum—is applied to the outer side of the ring part 16. In the case of the two-part structural design of the bung closure 10 according to the invention, the upper part with the cup-shaped basic body 12 and welded-in interlocking element 22—as in the case of customary steel bung plugs—is composed as before of metal or steel, while the lower part coming into contact with the charge is now composed of plastic. The plastics material is preferably composed of HDPE (high density polyethylene), but can just as readily be selected from another suitable plastic, such as, for example, nylon or polypropylene (PP).

The metallic basic body 12 with the welded-in interlocking element 22 and the two interlocking arcs 24 for the use of a corresponding tool wrench furthermore permits customary handling with magnetic screwdrivers.

In the case of the two-part composite bung closure according to the invention, on the other side the liquid charge still only comes into contact with the sprayed-on plastics layer 18, 30 and no longer with the metallic basic body which is susceptible to rust. This makes it possible to dispense with a complicated and cost-intensive special coating, for example as corrosion protection for the metallic basic body. For the upper side (surface) of the composite bung closure, which side does not come into contact with the aggressive charge, a simple zinc coating or paint coating suffices against normal environmental influences, (rain, sun, wind). In the case of this variant embodiment, a separate sealing ring 28 is provided above the plastics external thread 20 and directly below the upper metallic flange edge 26.

Figure 2:
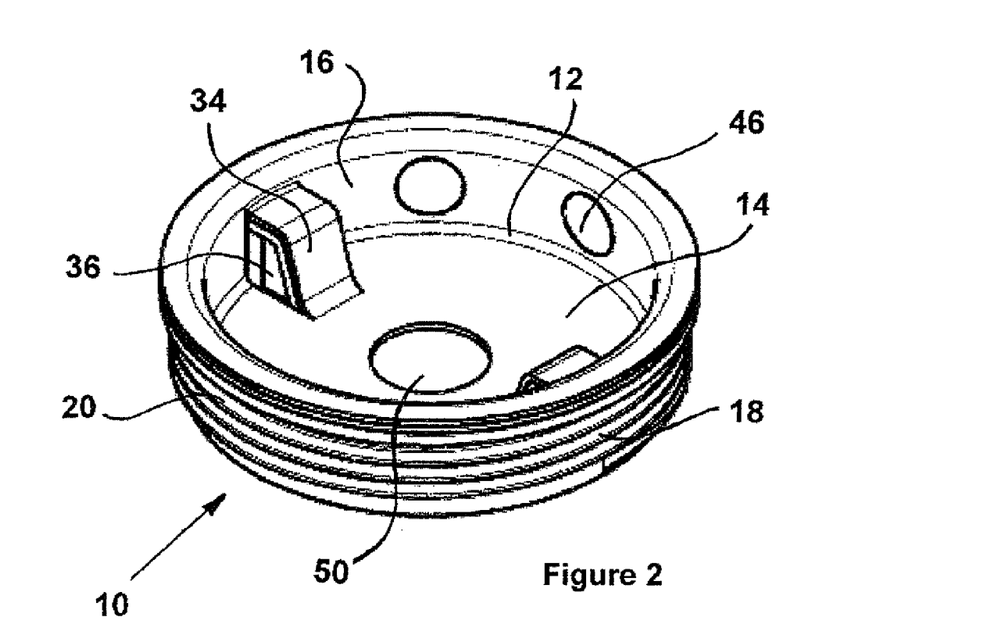
FIG. 2 shows another preferred embodiment of the bung closure according to the invention in a perspective view.

FIG. 2 shows another preferred refinement of the invention, in which two diametrically opposite, integrated interlocking elements 34 for the use of a tool wrench are provided within the cup-shaped basic body 12, said interlocking elements being formed from the disk-shaped base 14 by a punching operation as sheet-metal strips which are bent upward in a tongue-shaped manner. This makes it possible to completely save on the known, specially formed sheet-metal strip 22 which is welded in with six welding points and has interlocking arcs 24 on the outer side. The complicated production and the operation to weld in the separate component 22 are therefore entirely dispensed with.

The manufacturing operation of the integrated interlocking elements 34 according to the invention takes place directly during the shaping (punching, pressing, pushing, deep-drawing) of the metallic cup-shaped basic body 12, for example by a punching operation for the two U-shaped, upwardly bent sheet-metal strips. For the support of the two integrated interlocking elements 34 or upwardly bent sheet-metal strips and for tightly closing the resultant cutout in the disk-shaped base 14 of the cup-shaped basic body 12, said two integrated interlocking elements 34 or upwardly bent sheet-metal strips are insert molded with plastic in the direction of the tubular ring part 16, wherein said insert molding is then an integrated rear filling part 36 of the continuous, leakproof plastics layer 30 below the disk-shaped base 14.

This advantageous embodiment with integrated interlocking elements can not only be produced simply and cost-effectively in terms of manufacturing (few components), but also high torques can be transmitted without there being the risk of the welding points of the welded-in, separate (known) interlocking elements being detached. The omission of the welded-in, known sheet-metal strip enables the surface of the disk-shaped base of the metallic cup-shaped basic body 12 to be smooth and flat without unevenesses caused by the welded-on, known sheet-metal strips, and, as a result, simple, automatic screwing tools with, for example, a pneumatic suction holder (vacuum) could advantageously also be used.

Figure 3:
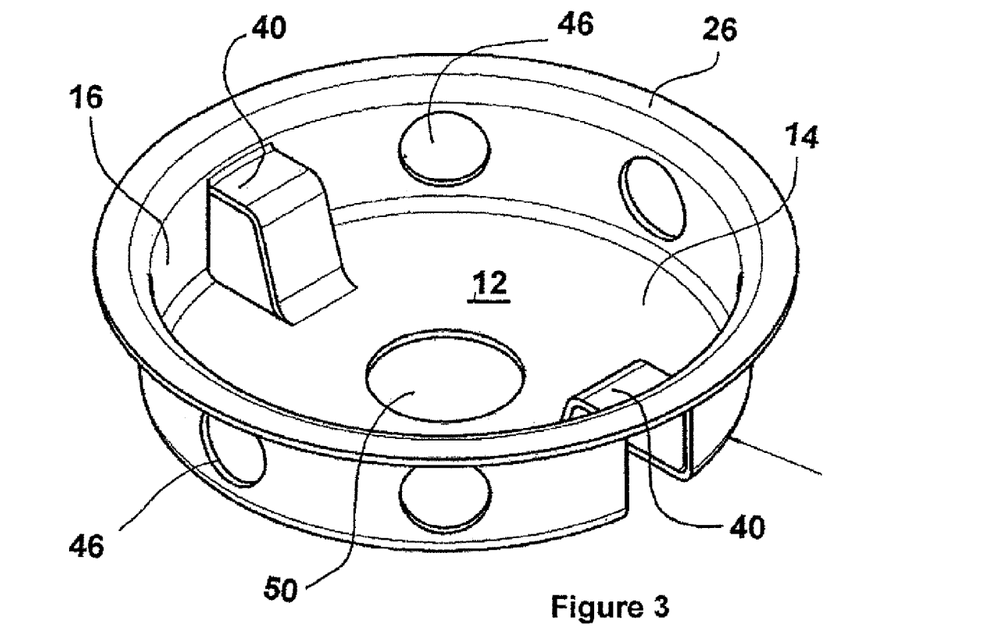
FIG. 3 shows the metallic cup-shaped basic body of the bung closure according to FIG. 2.
Figure 4:
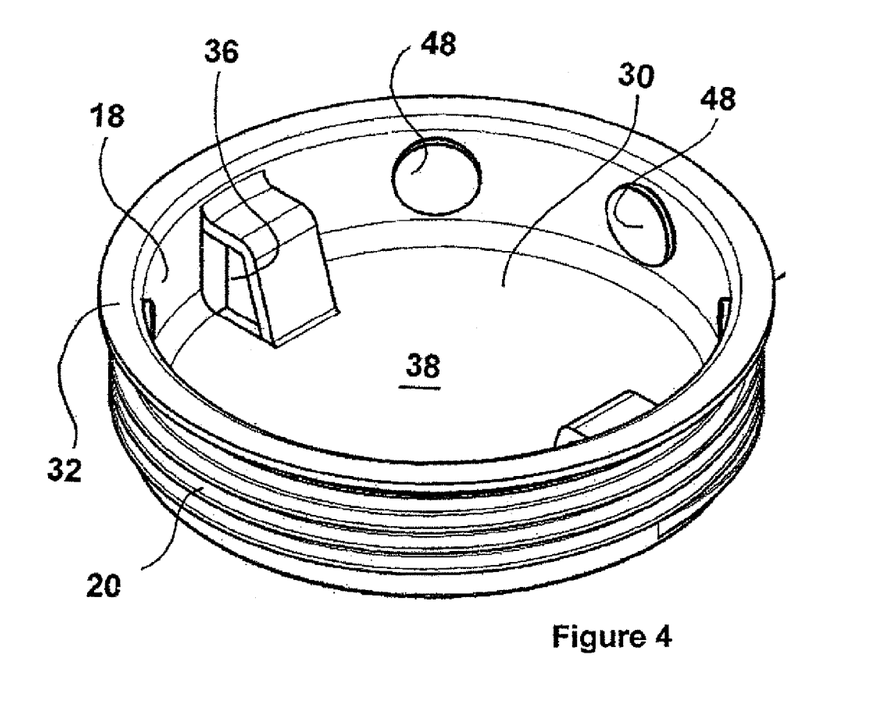
FIG. 4 shows the outer cup-shaped plastics part of the bung closure according to FIG. 2.

For better understanding, the metallic cup-shaped basic body 12 is illustrated once again separately in FIG. 3. The disk-shaped base 14 is adjoined on the outer side by a protruding, tubular ring part 16 which ends on the upper side with an upper flange edge 26. Two diametrically opposite sheet-metal tabs 40 as integrated interlocking elements for the attachment of a tool wrench are formed inward into the metal cup from the ring part 16 and the base 14. In the center of the disk-shaped base 14, a bore 50 can be provided centrally, optionally for the use of a special degassing or ventilation device. Said bore 50 is normally covered and sealed from below by the cup-shaped plastics part 38, which is illustrated separately in FIG. 4. The cup-shaped plastics part 38 can be sprayed directly onto the metallic basic body 12, which is inserted as an insert, in a corresponding injection mold, or can be premanufactured separately as an individual part in a simple injection mold. The premanufactured cup-shaped plastics part 38 is then pulled over the metallic basic body 12 and pressed thereon such that the inwardly pointing, round interlocking projections 48 latch from the outside into the corresponding, round interlocking cutouts 46 (for example bores or punched-out portions) in the tubular ring part 16 of the metallic basic body 12 in an interlocking and fixed manner. At the same time, the integrated rear fillings 36 of the cup-shaped plastics part 38 snap into the two formations behind the sheet-metal tabs 40 and latch there. The effect achieved by this advantageous refinement and connection of plastics cup and metallic basic body is that the torques required for fixedly screwing in and unscrewing the bung closures are very readily transmitted to the outer thread 20 of the tubular plastics layer 18—precisely to the location at which said torques are used. An undesirable slipping or rotation of the metallic basic body within the cup-shaped plastics part is therefore prevented.

Figure 5:
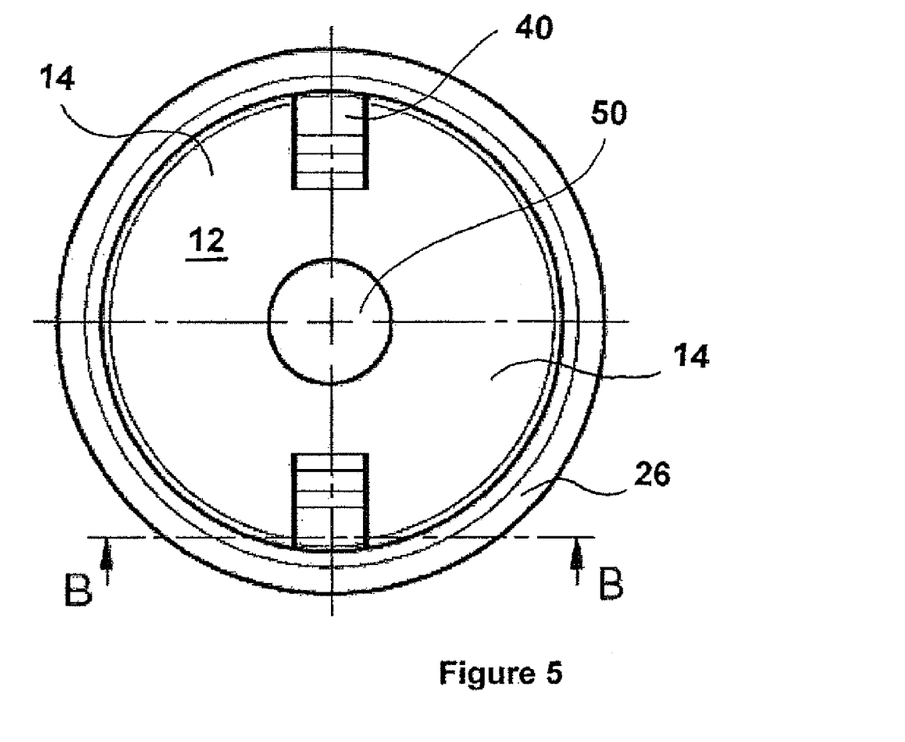
FIG. 5 shows a top view of the metallic cup-shaped basic body.

FIG. 5 once again shows a top view of the metallic basic body 12. It can be seen that the sheet-metal tabs 40 are fixedly connected toward the center to the disk-shaped base 14 and are fixedly connected toward the edge to the tubular ring part 16 and to the upper flange edge 26, and therefore said sheet-metal tabs provide a stable and fixed abutment for the use of a screwing tool, such as, for example, a torque wrench.

Figure 6:
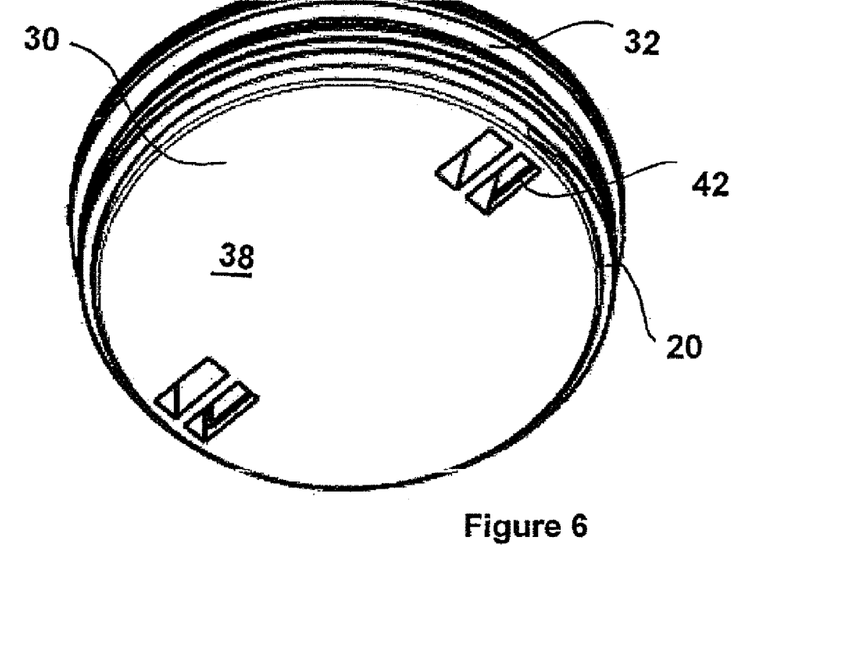
FIG. 6 shows a perspective view from below of the outer cup-shaped plastics part.

FIG. 6 shows the outer cup-shaped plastics part 38 in a perspective view from below. The diametrically opposite, integrated rear fillings and two cutouts, which are located next to each other and have lateral projections as a snap-on/latching connection 42 in the recesses of the sheet-metal tabs 40 of the metallic basic body 12 can be seen. Said cutouts do not necessarily have to be realized and are merely provided here for the purpose of saving on plastics material and reduced shrinkage. In this embodiment of the cup-shaped plastics part 38, an integrated sealing lip 32 (sealing ring), which is also injection-molded on, is provided at the upper end of the external thread 20.

Figure 7:
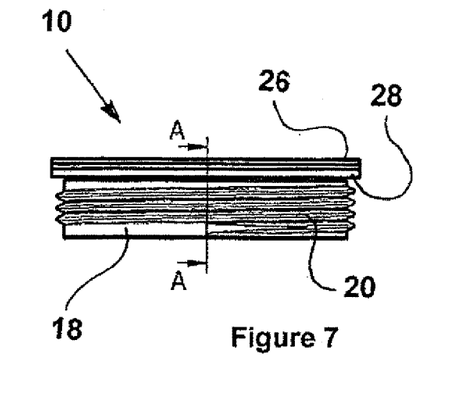
FIG. 7 shows a side view of the bung closure according to FIG. 2.
Figure 8:
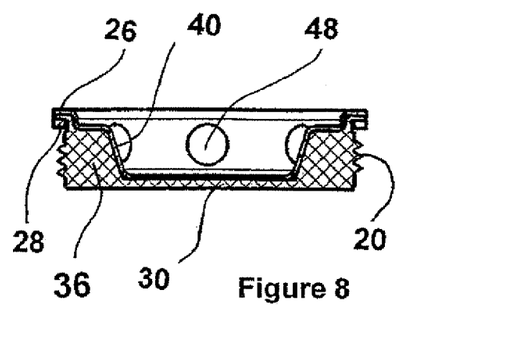
FIG. 8 shows a cross-sectional illustration according to intersecting line A-A in FIG. 7.
Figure 9:
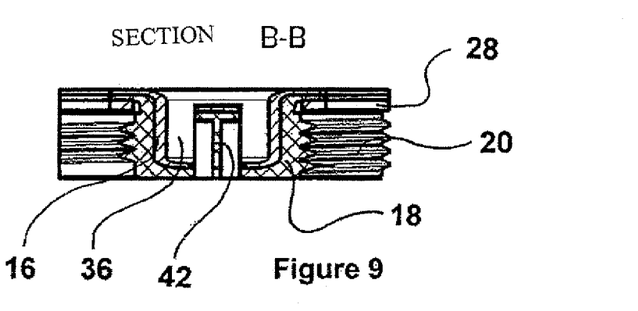
FIG. 9 shows a partial cutout of the bung closure according to the intersecting line B-B in FIG. 5.

FIG. 7 shows the bung plug 10 in a side view with a separate sealing ring 28. A cross-sectional illustration along the intersecting line A-A is illustrated in FIG. 8. The section here runs precisely through the rear fillings 36 of the cup-shaped plastics part 38 with the disk-shaped plastics layer 30. FIG. 9 finally shows a partial cutout of the bung closure according to the intersecting line B-B (in FIG. 5) through the tubular ring part 16 of the metallic basic body and the tubular plastics layer 18 with the external thread 20 of the cup-shaped plastics part. The cutouts for saving on material can be seen in the integrated rear filling 36. The rear filling has lateral projections for the snap-on/latching connection 42 to the metallic basic body.

In an advantageous manner, the version with a separately premanufactured plastics cup can best be realized with the preferred embodiment. The interlocking connections on the inside of the external thread ensure a secure support on the metallic basic body, and the plastics projections 48 engaging like a pin in the outer side in an interlocking manner in the metallic basic body transmit the maximum torques at a direct location behind the plastics thread 20 for a reliable and firm screwing in and unscrewing of the composite bung closures according to the invention. The bung closures according to the invention can be manufactured in all sizes, such as, for example, 2", 3" and ¾" (2" closures S 70×6 mm, ¾" closures S 38×6 mm, and 2" closures S 56×4 mm as per the VCI standard) or 2" buttress, BCS 56×4, or now ISO G2×11.5 (2" NPS) with a coarse-pitch or fine-pitch thread.

The invention claimed is:

1. A bung closure for gas-tight and liquid-tight closure of a bung opening of a container, comprising:
 a cup-shaped basic body made from metal and having a disk-shaped base and an adjoining, upwardly open, tubular ring part;
 at least one interlocking element in the form of a shaped sheet-metal strip or a tab provided within the cup-shaped basic body for engagement with a screwing tool for screwing the bung closure into, and out of the bung opening of the container; and
 a stable plastics layer provided on the outer side of the ring part, with an external thread formed on an outside of the plastics layer for threaded engagement with the internal thread of the bung opening, wherein the outer side of the ring part on which the plastics layer is provided is free of any thread formations,
 wherein between the outer side of the tubular ring part and the plastics layer a screwing secured interlocking-type fixed connection is provided for a transmission of high torques.

2. The bung closure of claim 1, wherein the container comprises a steel drum for storing and for transporting hazardous liquid charges.

3. The bung closure of claim 1, wherein the plastics layer extends continuously and leakproof over an entire outer surface of the cup-shaped basic body, said external thread being formed on the plastics layer in a region in which the plastics layer covers the outer side of the ring part.

4. The bung closure of claim 2, wherein the cup-shaped basic body comprises a two-part cup-shaped design, in which an upper cup-shaped part not coming into contact with the charge is composed of metal, preferably steel, and a lower cup-shaped part coming into contact with the charge is composed of plastic.

5. The bung closure of claim 1, wherein the interlocking element has respective ends shaped as arcs, and is welded onto an outward-facing side of the disk-shaped base.

6. The bung closure of claim 3, wherein the continuous, stable plastics layer with the external thread on the outer side is injection molded onto the entire outer surface of the cup-shaped metallic basic body.

7. The bung closure of claim 1, wherein the plastics layer forms a portion of a premanufactured injection molded cup-shaped plastics part having a disk-shaped base and an adjoining, upwardly open, tubular ring part and corresponds in shape to the cup-shaped basic body, said cup-shaped plastics part being pulled and nonreleasably fixedly latched onto the cup-shaped basic body and connected to corresponding undercuts of the cup-shaped basic body via a snap-on/latching connection.

8. The bung closure of claim 1, wherein a peripheral sealing seat for insertion of a separate sealing ring is formed in the outer plastics layer above the external thread and directly below an upper flange edge of the metallic basic body.

9. The bung closure of claims 6, wherein the outer plastics layer has an integrated sealing lip above the external thread and directly below the upper flange edge of the metallic basic body, said integrated sealing lip being injection-molded onto the cup-shaped basic body along with the plastics layer.

10. The bung closure of claim 9, wherein the plastics layer is made from basic plastic and the sealing lip is composed of a different plastics material than the plastics layer and is formed by two-component injection molding.

11. The bung closure of claim 1, wherein the at least one interlocking element comprises curved, upwardly protruding sheet-metal strips formed from the disk-shaped base and/or from the tubular ring part on at least two diametrically opposed sides within the cup-shaped metallic basic body.

12. The bung closure of claim 11, wherein an integrated portion of the continuous plastics layer engages into and supports the upwardly protruding sheet-metal strips at least partially in the direction of the tubular ring part, below the disk-shaped base.

13. The bung closure of claim 1, wherein the at least one integrated interlocking element is constructed as an inwardly curved sheet-metal tab formed from the tubular ring part and partially from the disk-shaped base on at least two diametrically opposing sides within the cup-shaped metallic basic body, said sheet-metal tab being connected fixedly at its upper end to the tubular ring part or to an upper flange edge of the tubular ring part and being fixedly connected at its lower end to the disk-shaped base.

14. The bung closure of claim 13, wherein a pin-like plastics projection which is integrated into the plastics layer is formed on at least two diametrically opposing sides on an inner side of the plastics layer approximately opposite the external thread of the plastics layer, said plastics projection engaging in an interlocking manner from the outside with a precise fit into cutouts formed in the ring part and optionally partially in the disk-shaped base, said cutouts being formed by the inwardly curved sheet-metal tabs.

15. A method for producing the two-part bung closure for gas-tight and liquid-tight closure of the bung opening of the container of claim 1, comprising: inserting the cup-shaped basic body made from metal, having the disk-shaped base and the adjoining, upwardly open, tubular ring part into an injection mold; permanently injection molding the stable plastics layer at least onto an outer side of the tubular ring part; and forming the external thread in the plastics layer by a correspondingly shaped inside of the injection mold.

16. A method for producing the two-part bung closure for the gas-tightand liquid-tight closure of the bung opening of the container of claim 1, comprising: preforming the cup-shaped basic body made from metal having the disk-shaped base, integrated interlocking elements and the adjoining, upwardly open, tubular ring part; premanufacturing in an injection mold a cup-shaped plastics part corresponding in shape to the cup-shaped basic body and having a disk-shaped base and the adjoining, upwardly open, tubular ring part with the external thread; and pulling the cup-shaped plastics part over the cup-shaped metal basic body and nonreleasably fixedly latching and connecting the cup-shaped plastics part to corresponding undercuts via a snap-on/latching connection.

* * * * *